United States Patent [19]
Ogilvie et al.

[11] Patent Number: 6,038,629
[45] Date of Patent: *Mar. 14, 2000

[54] COMPUTER SYSTEM GENERATING A PROCESSOR INTERRUPT IN RESPONSE TO RECEIVING AN INTERRUPT/DATA SYNCHRONIZING SIGNAL OVER A DATA BUS

[75] Inventors: Clarence Rosser Ogilvie, Huntington; Paul Colvin Stabler, South Burlington, both of Vt.

[73] Assignee: International Business Machines Corporation, Armonk, N.Y.

[ * ] Notice: This patent is subject to a terminal disclaimer.

[21] Appl. No.: 09/156,510

[22] Filed: Sep. 17, 1998

Related U.S. Application Data

[62] Division of application No. 08/732,790, Oct. 15, 1996, Pat. No. 5,854,908.

[51] Int. Cl.⁷ .................................................. G06F 13/00
[52] U.S. Cl. .......................... 710/128; 710/129; 710/267; 710/28
[58] Field of Search ..................................... 395/308–309, 395/733, 735, 740, 741, 200.61, 200.62, 200.65, 200.68, 200.67, 200.75, 200.78, 200.79, 835, 837, 838–839, 858, 868, 881

[56] References Cited

U.S. PATENT DOCUMENTS

| 5,105,424 | 4/1992 | Flaig et al. | 370/94.1 |
|---|---|---|---|
| 5,265,255 | 11/1993 | Bonevento et al. | 395/733 |
| 5,485,584 | 1/1996 | Hausman et al. | 395/842 |
| 5,530,874 | 6/1996 | Emery et al. | 395/735 |
| 5,537,646 | 7/1996 | Buck et al. | 395/500 |
| 5,619,687 | 4/1997 | Langan et al. | 395/557 |
| 5,632,021 | 5/1997 | Jennings et al. | 395/309 |
| 5,659,758 | 8/1997 | Gentry et al. | 395/733 |
| 5,675,807 | 10/1997 | Iswandhi et al. | 395/733 |
| 5,854,908 | 12/1998 | Ogilvie et al. | 395/308 |

OTHER PUBLICATIONS

"The IBM Mwave 3780i DSP", by Bernbaum, et al., Proceedings of Seventh Annual Conference on Signal Processing Applications and Technology, pp. 1287–1291, Oct. 7–10, 1996.

"Condition code prediction for fixed–point arithmetic units" by S. Vassiliadis and M. Putrino, Int. J. Electronics, 1989, vol. 66, No. 6, pp. 887–890.

Mwave Developers Toolkit, DSP Task Progammer's Guide, Intermetrics, Inc., Dec. 1993.

Mwave Developers Toolkit, Assembly Language Reference Manual, Intermetrics, Inc., Dec. 1993.

Primary Examiner—Ayaz R. Sheikh
Assistant Examiner—Raymond N Phan
Attorney, Agent, or Firm—Patrick J. Daugherty; Driggs, Lucas, Brubaker & Hogg Co., L.P.A.

[57] ABSTRACT

A computer system having interrupts synchronized to data storage by having an interrupt data signal (interrupt packet) follow the path of the data to an interrupt receiver, which interrupts the processor to execute an interrupt service routine. Rather than having a dedicated interrupt line from a peripheral device to a processor, the peripheral device sends the interrupt across a bus from the peripheral to the processing unit via an interrupt receiver. The system can include a processor; a memory circuit in circuit communication with the processor; a peripheral device in circuit communication with the memory circuit via a bus; and an interrupt circuit in circuit communication with the peripheral circuit via the bus and in circuit communication with the processor via an interrupt bus; and wherein the peripheral device transmits data to the memory circuit across the bus and then transmits a predetermined interrupt data signal to the interrupt circuit across the bus; and wherein the interrupt circuit asserts an interrupt signal onto the interrupt bus to interrupt the processor responsive to receiving the predetermined interrupt data signal from the bus, thereby assuring that the processor is interrupted after the data is transmitted to the memory circuit.

10 Claims, 2 Drawing Sheets

COMPUTER SYSTEM GENERATING A PROCESSOR INTERRUPT IN RESPONSE TO RECEIVING AN INTERRUPT/DATA SYNCHRONIZING SIGNAL OVER A DATA BUS

This is a Divisional in prior application Ser. No. 08/732,790 U.S. Pat. No. 5,854,908.

FIELD OF THE INVENTION

The present invention relates generally to computer system architecture and, more specifically, to a processing system having an interruptible processor and an associated peripheral device in which the peripheral device transmits data to a memory circuit via a particular bus path and, thereafter, the peripheral device transmits an interrupt data signal to a separate interrupt circuit along the same path as the data, thereby assuring that the processor is interrupted after the data is stored in the memory circuit.

BACKGROUND OF THE INVENTION

Personal computer systems are well known in the art. Personal computer systems in general, and IBM Personal Computers in particular, have attained wide-spread use for providing computer power to many segments of today's modern society. Personal computers can typically be defined as a desktop, floor standing, or portable microcomputer that is comprised of a system unit having a processing unit and associated volatile and non-volatile memory, including all RAM and BIOS ROM, a system monitor, a keyboard, one or more flexible diskette drives, a fixed disk storage drive (also known as a "hard drive"), a so-called "mouse" pointing device, a modem, a sound card, a CD-ROM drive, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's "APTIVA" line of computers.

Typically, many of the above electronic devices are interfaced to the processor using interrupts. When a device asserts an interrupt signal on an interrupt line, the processor performs a task associated with the device that asserted the interrupt. For example, a modem is typically interfaced to the system via a serial bus controller, which is connected to the processor via a peripheral bus and an interrupt line. While receiving data, the modem will periodically interrupt the processor to perform a particular task with the received data. After the processor performs the task, the processor resumes the task it was performing when it was interrupted. Thus, interrupts are often used by a peripheral device to notify the processing unit that data gathered by the peripheral is now available for use by the processing unit.

Systems have a number of "buses" between which electrical signals pass. For example, a typical system might have a "local bus" associated with a particular processor and one or more "peripheral buses," e.g., a peripheral component interconnect (PCI) bus or an industry standard architecture (ISA) bus. The term "bus" is used to describe a plurality of associated electrical conductors, a plurality of associated electrical signals being transmitted, or both the conductors and the signals. Buses pass data at different rates and latencies. On systems with medium to high bus latencies, there can be problems with synchronizing data with interrupts used to inform the processor that the data is ready. In systems with medium to high latencies, synchronization of the processor interrupt with arrival of the data in the system's memory can be a problem. That is, the separate interrupt signal can arrive at the processor before the data has fully traversed the bus and has arrived in the system memory. This may result in the use of invalid data by the processor. Moreover, at any one time, many devices, e.g., a mouse, modem, CD-ROM drive, hard drive, etc., might all be trying to send data to and interrupt the processor contemporaneously. This aggravates the problem of data interrupt synchronization.

Various prior art ways of dealing with this problem have many drawbacks. For example, one prior art method of synchronizing the data with an associated interrupt is to time-stamp the data. This requires that the processor poll the data looking for data with the proper time-stamp, which wastes processor power.

SUMMARY OF THE INVENTION

According to the present invention, a peripheral device in a computer system synchronizes data with interrupts by sending the interrupt to the processor along the same data path as the data and after the data is sent. Instead of having a dedicated interrupt line between the peripheral device and the processor (or an interrupt controller), the peripheral sends a distinct interrupt data signal (interrupt packet) along the bus or buses through which the data passes to get to the memory. For example, if the data passes across a peripheral bus then across a local bus, then the interrupt data signal (interrupt packet) passes across at least one of those buses. To implement the present invention, an interrupt circuit is added as a device on one of the buses. After the data passes across the bus, the interrupt circuit receives the interrupt data signal and interrupts the processor. Since the interrupt data signal travels at least a portion of the path the data travels, the processor is not interrupted until the data is in memory.

That is, the interrupt is actually "sent" across the bus from the peripheral to the processing unit via an interrupt receiver. After transmitting its data across the bus, the peripheral sends a special "interrupt packet" to a unique interrupt circuit associated with the processor. This interrupt packet is intercepted by the interrupt circuit's hardware via an address on the bus, which results in the generation of an interrupt signal to the processor. Because the interrupt packet is sent after the data, the processor is guaranteed to have valid data in the system memory, no matter how much latency exists on the system bus.

The present invention can take the form of a processing system, comprising a processor; a memory circuit in circuit communication with the processor; a peripheral device in circuit communication with the memory circuit via a bus; and an interrupt circuit in circuit communication with the peripheral circuit via the bus and in circuit communication with the processor via an interrupt bus; and wherein the peripheral device transmits data to the memory circuit across the bus and then transmits a predetermined interrupt data signal to the interrupt circuit across the bus; and wherein the interrupt circuit asserts an interrupt signal onto the interrupt bus to interrupt the processor responsive to receiving the predetermined interrupt data signal from the bus, thereby assuring that the processor is interrupted after the data is transmitted to the memory circuit.

It is therefore an advantage of the present invention to provide a data processing system that ensures that a processor is not interrupted until after data associated with the interrupt is in memory.

It is another advantage of the present invention to provide a peripheral device that sends an interrupt data signal across a bus across which the peripheral device previously sent data associated with the interrupt data signal.

It is a further advantage of this invention to provide an interrupt circuit to receive an interrupt data signal on a bus across which data associated with the interrupt data signal has passed.

These and other advantages of the present invention will become more apparent from a detailed description of the invention.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below serve to example the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
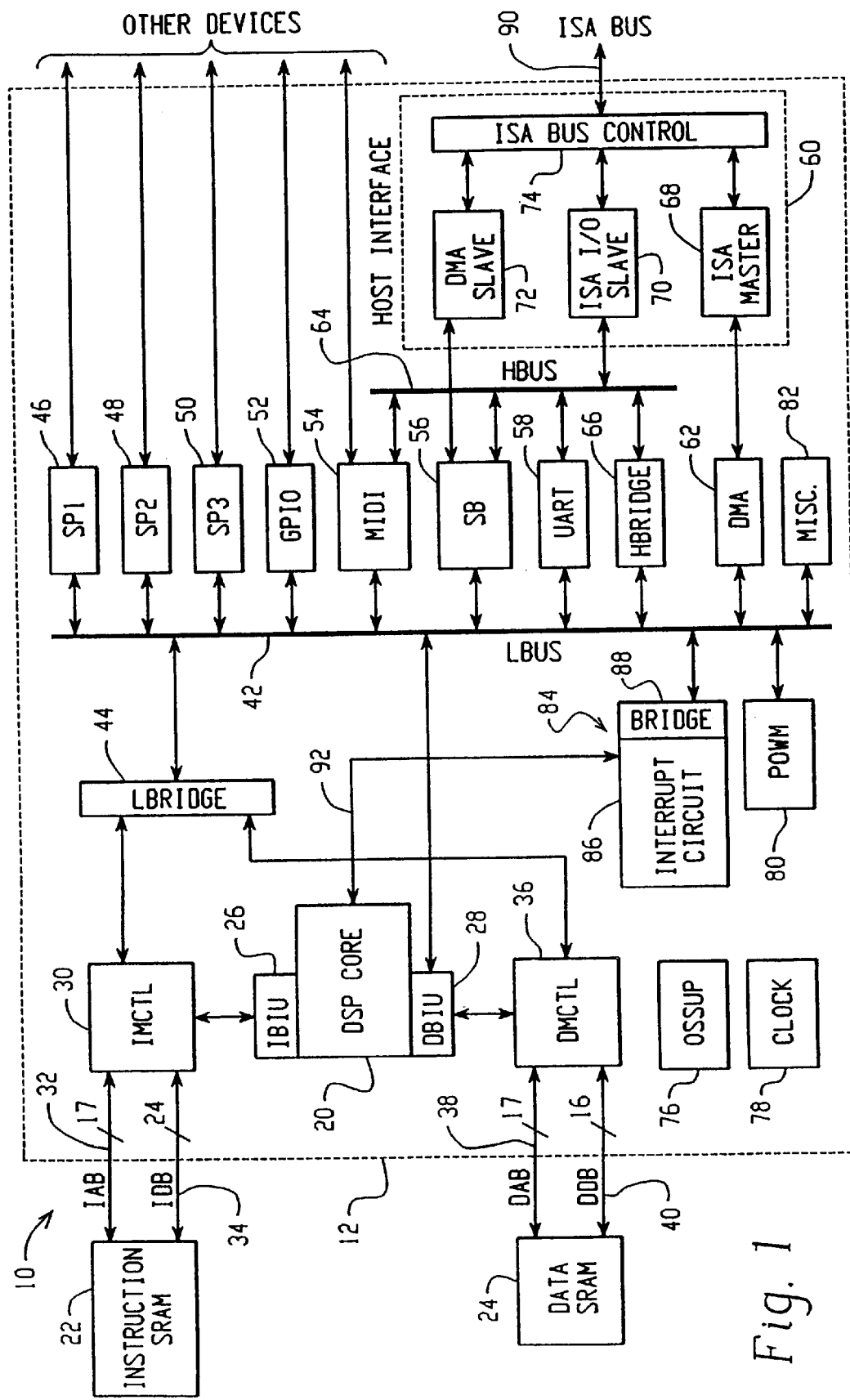
FIG. 1 is a block diagram of a first embodiment of the present invention.

Referring now more particularly to the accompanying drawings, a system embodying the present invention is there shown and generally indicated at 10 (FIG. 1). FIG. 1 is a block diagram of the system 10 making use of the data interrupt synchronization of the present invention. The system 10 includes a chip 12 having a processor 20, which in this case is a data signal processor (DSP) core 20. The Harvard architecture of the DSP core 20 requires connection to a separate instruction memory 22 and data memory 24. The DSP core is in circuit communication with the memories 22, 24 via an Instruction Bus Interface Unit (IBIU) 26 and a Data Bus Interface Unit (DBIU) 28, respectively. The IBIU connects to an Instruction Memory Controller (IMCTL), which attaches a 17-bit Instruction Address Bus (IAB) 32 and a 24-bit Instruction Data Bus (IDB) 34 to up to 128K words of off-chip instruction SRAM 22. The DBIU 28 connects to a Data Memory Controller (DMCTL) 36, which attaches the 17-bit Data Address Bus (DAB) 38 and 16-bit Data Data Bus (DDB) 40 to up to 128K words of off-chip data SRAM 24. The DBIU 28 also provides the DSP core's interconnection to an Lbus (local bus) 42.

The Lbus 42 is the processor local bus and interconnects the peripherals and the DSP core 20 to the instruction and data memories 22, 24. An Lbridge 44 provides the necessary arbitration to allow peripheral device on the Lbus 42 access to the instruction and data memories 22, 24 via the IMCTL 30 and DMCTL 36 blocks, respectively. A global system addressing scheme provides addressability of all entities on the Lbus 42. Most if not all entities on the Lbus 42 can become bus master of the Lbus to write data to and read data from the data memory 24. An arbiter (not shown) arbitrates between bus requests and grants of the various entities on the Lbus 42.

The complement of on-chip peripherals consists of three serial bus controllers (SP1 46, SP2 48, SP3 50), a General Purpose IO controller (GPIO) 52, a MIDI interface 54, a circuit 56 to emulate the SOUND BLASTER sound card (SB) 56, a NS16550A universal asynchronous receiver/transmitter (UART) emulation hardware 58, an ISA bus interface 60, and a DMA machine 62. A second on-chip bus, the Host Bus (Hbus) 64, allows direct host access to addresses in the MIDI 54, SB 56, and UART 58 circuits. The Hbridge 66 facilitates host accesses to all addressable entities up on the Lbus 42. The DMA machine 62 provides data movement operations between any two system addresses, any system address and a host address (ISA bus I/O or memory address), or any two host addresses. The host bus interface 60 consists of an ISA master section 68, an ISA I/O slave section 70, a DMA slave 72, and an ISA bus control section 74.

Other circuit blocks include an Operating System Support block (OSSUP) 76, which provides hardware support for the Mwave/OS DSP operating system and acts as a focal point for core interrupts; a clock block 78, which provides all the clock frequencies necessary for operation of the chip 12; a power management block (POWM) 80, which provides for shutdown of the core clock, with wake-up-on-interrupt capability, as well as for shutdown of practically the entire chip 12; and a miscellaneous block (Misc.) 82, which collects a number of functions, including chip initialization and reset registers. A final circuit block is the interrupt receiver 84 according to the present invention, which includes an interrupt circuit 86 and a bridge 88.

The DSP core processor 20 is a redesigned implementation of the instruction set architecture described in the *Mwave Developers Toolkit—Assembly Language Reference Manual*, Intermetrics, Inc., 1993. Compatibility with the existing base of Mwave DSP code is maintained, while improving DSP core performance. In addition, the DSP core implements a number of new instructions and features to improve code efficiency.

The DSP core is a 16-bit fixed-point processor consisting of a 16×16 multiplier; 32-bit ALU; 32-bit barrel shifter; data address generator; eight, 16-bit general purpose registers, 2 of which are extended to 32 bits, and 2 of which are designated as index registers; a program control unit; and status and control registers, all not shown in the figures. A number of improvements were made to the DSP core data path to allow operation at a significantly increased clock frequency while employing the same circuit technology as the previous generation chip. A custom multiplier is used, employing an array multiplication algorithm optimized for the circuit technology. R. A. Bechade, W. K. Hoffman, C. R. Ogilvie, "Digital Binary Array Multipliers Using Inverting Full Adders", U.S. Pat. No. 4,768,161, August 1988. The ALU was completely redesigned, incorporating several delay-reducing features, including result-equal-zero prediction logic, S. Vassiliadis and M. Putrino, "Condition code predictor for fixed-point arithmetic units", *Int. J. Electronics*, vol. 66, no. 6, pp. 887–890, 1989, and a novel approach to computing the minimum/maximum operation. B. Blaner and D. R. Strouptauer, "Processing System and Method for Minimum/Maximum Number Determination", U.S. Pat. No. 5,515,306, May 1996. Custom registers were used throughout the DSP core 20, significantly reducing register access delay.

Several new instructions and features are implemented in the DSP core 20. Zero-overhead autolooping has been added to the program control unit logic, allowing loops of up to 65536 instruction words and iterations to be coded. Loops are interruptible at any point and may be nested by saving/ restoring the loop registers. Index register auto-updating was added to the data address generator, allowing the index registers to be automatically updated by the 2's complement displacement specified in instructions that access data memory. Procedure call and return instructions were also added. To meet the demand for increased memory addressability, a new 32-bit system address was defined. A system address is generated by suing the high-order 4 bits of a 16-bit instruction address or 15-bit data address to select 1 of 16 logical segment registers. The contents of the selected segment register are then used to extend the offset field (the low-order bits of the original address). A bit in the segment register partitions the system address space into memory and I/O space. Segmentation hardware was added to the program control unit and data address generator to accomplish the necessary segmentation on memory references. Also, I/O read and write instructions were added to allow single-cycle access to IO space.

The Lbus 42 is a scaleable on-chip bus that interconnects peripherals and the core to instruction and data memories 22, 24. The Lbus 42 supports any mix of masters and slaves using parallel control, address and data buses. Address and data bus widths are easily scaled for any particular chip; the system 10 implements a 22-bit address bus and a 16-bit data bus. Three levels of pipelining coexist, so each master or slave may independently trade off design complexity against performance. Atomic accesses are allowed and may be propagated through a bridge hierarchically up one level to an external busing system. An addressed slave throttles the speed of the data transfer. A custom bridge—the Lbridge 44—was designed to interface the Lbus 42 to a tightly coupled memory system.

Two similar memory controllers, the IMCTL 30 and DMCTL 36, interface the chip 12 to external instruction and data memories 22, 24. The controller definition allows the memory interfaces to adapt to different memory technologies, but currently only zero-wait-state asynchronous SRAM is supported.

A single serial port controller (SP) design is repeated in the chip 12 three times. Each of the SPs 46, 48, 50 may be connected to any one of three free-running interrupts supplied by the clock 78—44.1 KHz/32, 9.6 KHz and 8 KHz—and move data at the associated interrupt rate. The SPs 46, 48, 50 are autobuffered; i.e., each SP is a bus master on the Lbus 42 to store received data in or fetch transmitted data from circular buffers in data memory 24. The SPs are individually programmed to adapt to the interface protocols of the following CODECs: Crystal Semiconductor CS4216/ 18, CS4236 and CS4231A; SGS-Thomson STLC7549; Chrontel CH6357; TI TCM320AC36/37 voice-band audio processor (VAP) and TP3054B PCM CODEC8.

The UART emulation hardware 58 on the chip 12 provides a NS16550A UART compatible interface when addressed through the ISA bus interface logic 60. The overall UART function is carried out in a coupled fashion by both the emulation hardware and the BIOS software executing on the DSP core 20. In general, the emulation hardware performs byte wide parallel data movement from the host processor to circular buffers in data memory for the UART transmit operations and vice versa for receive operations. The BIOS software periodically processes the data in circular buffers to complete the UART function and downstream communication. Thus, much of the serial clocking and shift register logic present in conventional UARTs is not required in the emulation hardware. Internal timers and data throttling mechanisms are used to maintain NS16550A compatibility. In addition to data movement, the emulation hardware also provides both NS16550A type status and interrupt signals back to the host processor.

The Musical Instruments Digital Interface (MIDI) port 54 on the chip 12 provides the basic hardware needed to support one MIDI IN port, one MIDI OUT port, and one MIDI THRU port. The MIDI port 54 is a bus master on the Lbus 42 to perform its transfers to data memory 24. The MIDI port 54 supports three modes of operation: MPU-401 UART mode—all control is performed by the host processor through MPU-401 UART mode registers; MPU-401 mode with snoop—host processor retains control of all data transfers but the DSP core 20 is allowed to monitor all host processor transfers to data memory; and Intercept Mode— all data transfers are under control of the DSP core 20.

The chip 12 implements the SB hardware 56 and software interface necessary to provide DOS Sound Blaster (SB) emulation of Adlib, Sound Blaster 2.0, and Sound Blaster Pro audio cards. This enables Mwave SB compatibility in a DOS-only environment without the need for support from VxD's or other DOS memory resident programs. It also performs under "WINDOWS" and "OS/2" environments.

The ISA slave logic 70 decodes the various SB and OPL accesses and passes the appropriate Hbus 64 cycle to the SB emulation logic 56. The SB emulation logic 56 handles the data and provides the handshaking mechanism between the host, the SB logic 56, and the DSP using DSP I/O-mapped data and control registers and an asynchronous DSP interrupt mechanism. In general, the SB emulation logic handles data movement and the DSP software handles data processing and hardware control. In the case of OPL and DAM slave accesses, the SB logic maps the accesses to appropriate circular buffers in data memory. The software periodically processes the data in the circular buffer to provide the FM synthesis or DMA wave play/record functions. The SB implementation provides a flexible, software configurable solution to sound card emulation. The DSP I/O-mapped control registers allow for varying emulation methods. In addition, the implementation provides software configurable host DMA channel and interrupt channel selection.

The ISA bus interface 60 consists of the I/O slave section 70, the ISA master section 68, the DMA slave 72, and the ISA bus control 74. The function of the ISA I/O slave logic 70 is to isolate resources of the chip 12 from the asynchronous control, resource and protocol requirements of the ISA bus and to provide a programming interface for host software to access chip resources. This latter function is accomplished through the use of a synchronous internal bus called the Hbus 64. The ISA resource requirements of the chip 12 are defined in configuration registers. The ISA bus is driven directly from the chip, using 24 mA output buffers where necessary, thereby reducing system cost. The chip has 7 pins for ISA interrupts (level and edge configurable) and 10 pins for 5 ISA DMA channels. A linear feedback shift register is used to program the chip base address by host software.

The function of the ISA master logic 68 is to isolate the DMA machine 62 from the asynchronous control, resource and protocol requirements of the ISA bus 90. As an alternate bus master, the logic performs data transfers between either host memory or I/O space and the addressable space of the chip 12. In DMA byte mode, data is moved on the ISA bus in packed format to maximize throughput and minimize bus bandwidth requirements. Configuration registers in the ISA I/O slave are used to tune the ISA bus data transfer for varying system configurations.

The function of the ISA DMA slave logic 72 is to perform ISA bus DMA data movements between the SB emulation logic 56 and host memory (not shown). The data movements are requested by the SB logic 56 and data is either latched form the ISA bus or steered onto the ISA bus for DMA slave reads and writes, respectively.

The DMA machine 62 is an independent machine optimized to move data from one location to another, freeing up the DSP core 20 to perform other tasks. In doing so, it isolates the tasks from the non-real-time nature of the host PC. The DMA is programmed via special opcodes called Packet Control Blocks (PCB), typically stored in DSP data memory. The DMA supports MDSP2780-compatible functions of data transfers between host memory and DSP memory. New features include support for the extended addressing (32 bit) of the chip 12, the capability to move data anywhere within this address space (host memory to host memory, DSP memory to DSP memory, peripheral to host memory, etc.), PCB processing complete notification and PCB linking capability. 'Typically a task requests data movement by calling an Mwave/OS system service. This system service accepts the information needed for the PCB, and then adds the PCB to the list of PCBs to be executed by the DMA machine.

The GPIO block 52 provides an interface to IO pins which may be used as an on/off signals for functions such as off-hook relay control, programmable reset lines to external CODECs, ring-indicate inputs, and etc. Input, output and output-enable multiplexers allow the sharing of 16 chip pins between multiple functions. Each pin has a two-bit field to specify function of the pin at any point in time. One of the options is the GPIO bus. In this case, two bits exist to individually control each output data and enable. The input data is assumed asynchronous and is synchronized to the local clock.

The chip 12 contains several facilities for the support of Mwave/OS—a real time operating system designed for the concurrent scheduling of multiple groups of signal processing tasks, each of which may operate on its own data stream. D. E. Carmon and E. A. Hinzelman-Fortino, "The Mwave Operating System: Support for Hard Real-Time Multitasking", *DSP Applications,* vol. 3, no. 3, pp. 21–26, March 1994. Since these data streams may be asynchronous to each other, a 16-bit read-only free-running counter, called the Real Time Clock (RTC), is provided as a universal time base by which the asynchronous data streams can be reconciled and the real time tasks can be scheduled. Three, 16-bit, read-only Interrupt Time Stamp Registers (ITSR), working in conjunction with the RTC, allow for simultaneous support of up to three different fundamental data streams. Each data stream has a nominal sample rate and an associated interrupt strobe which is used to time stamp, i.e., periodically capture the value of the RTC in the appropriate ITSR, that data stream.

Additionally, two 16-bit read/write counters, the Task Instruction Cycle Counter (TICC) and the Other Instruction Cycle Counter (OICC) are provided for monitoring the processor usage of both individual signal processing tasks and all processes in general. The TICC only counts processor cycles that are associated with, or executed specifically on behalf of, an individual task. The OICC counts processor cycles executed by other non-task-related processes.

The DSP core 20 has provision for eight vectored interrupts. In the chip 12, three of the eight are allocated to the periodic interrupts described above. Two interrupts are allocated for external use. One interrupt services a shared interrupt known as the Asynchronous Interrupt Mechanism (AIM), which may have up to 16 prioritized interrupt sources. The AIM enables Lbus 42 transfers to be synchronized with an interrupt according to the present invention using the interrupt receiver 84, which will be described in more detail below. The remaining two interrupts are reserved.

The chip 12 contains two phase locked loops (PLLs) which supply all chip and peripheral clock frequencies. A 33.8688 MHz crystal connects to both PLLs. PLL1, which supplies the clock to the core, Lbus, and memory interfaces, is fully programmable to run at frequencies ranging from 17 to 50 MHz. Alternatively, an external source may be used (PLL1 bypass). PLL2 has a fixed divider network supplying clocks to the various peripherals.

Power consumption in CMOS circuits is proportional to switching activity. In the chip 12, power management is achieved by preventing switching in a block of circuits by stopping its clock. The core and other selected blocks are managed under software control During idle periods, the core can stop its clock by writing the Sleep Control register. The clock is restarted when an interrupt is detected by a continuously active portion of the interrupt control logic. Additionally, software can shutdown clocks in the entire chip, including the PLLs, leaving only a few registers in the host interface active, allowing operation to resume in response to a host command.

The chip 12 is backward compatible to the conventional MDSP2780 software environment. *Mwave Developers Toolkit—Task Programmers Guide,* Intermetrics, Inc., 1993. All hardware-specific changes are encapsulated in the Mwave/OS operating system and Mwave BIOS tasks. The three periodic interrupt sources described previously are used by Mwave/OS to schedule real-time frame managers which in turn schedule BIOS and user tasks. Non-real-time frame managers schedule the background tasks. Controls for new features such as zero-overhead autolooping and index register auto-updating are saved as part of the task context and are available to user tasks. The address segmentation scheme enables tasks to operate in a virtual address environment. This requires support from both Mwave/OS and the host-resident Mwave Manger. Support for 32-bit-address DMA has been added, while maintaining backward compatibility with 16-bit-address DMA transfers. Mwave BIOS tasks have been rewritten to utilize the Lbus interface and control the new generation of peripheral components. New features available in the chip 12 have also been incorporated in the BIOS tasks to improve efficiency and reduce code size. The BIOS task public interfaces have remained unchanged, allowing existing user tasks to run in the chip environment. BIOS tasks now have the option of employing the GPIO features of the chip to control individual external on/off signals in a mutually exclusive manner.

Mwave PC software controls the DSP through 8, 16-bit registers located in the ISA slave logic 70 and Hbridge logic 66. These registers provide efficient windowed access to the data, instruction, and I/O spaces in the chip 12 and include support for read, write, and read & clear atomic operations. The PC software also controls the reset, clocking, configuration, and interrupt processing thorough these registers.

The chip 12 is implemented in the IBM CMOS4LP technology-a cost-effective 3.3 v, 0.8 $\mu$m technology with 0.45 $\mu$m $L_{eff}$. At worst-case process, temperate and voltage, the maximum core clock frequency is 45 MHz, delivering 45 MIPS. External SRAMs 22, 24 with 12-ns access time are required to achieve this operating frequency. The die size is 7.45×7.85 mm² and is packaged in a 240-pin PQFP package.

The interrupt receiver 84 according to the present invention includes the interrupt circuit 86 and the bridge 88. The interrupt circuit 86 interfaces to the DSP core 20 via an interrupt bus 92, which comprises four encoded lines representing the sixteen interrupts of the shared interrupt. The bridge 88 is at its own address space on the Lbus 42 and receives interrupt data signals (interrupt packets) from the Lbus 42. The bridge 88 can be as simple as a decoder and register or FIFO to decode a range of addresses corresponding to the interrupt receiver 84 and latch any interrupt data signals written thereto. In the alternative, the bridge can have a number of writable registers to place the bridge in various address spaces in the Lbus 42. As yet another alternative, the bridge 88 can be as complex as the bridges built into the various peripherals 46, 48, 50, 52, 54, 56, 58, 62, 66, 82. The bridges (not shown) of these peripherals are more extensive bridges allowing the respective peripherals to become bus master of the Lbus 42 as well as data-receiving slaves of the Lbus 42.

After the bridge decodes an interrupt data signal from the Lbus 42, it is passed to the interrupt circuit 86, which asserts an interrupt onto the interrupt bus 92. The interrupt asserted onto the interrupt bus 92 corresponds to the device that transmitted the interrupt data signal across the Lbus 42. The interrupt receiver 84 can distinguish between interrupt sources in a number of ways. One way is to have the bridge 88 of the interrupt receiver located in only one address of the Lbus address space and each interrupt source sends a unique predetermined interrupt data signal to that address on the Lbus 42. In the alternative, the bridge 88 of the interrupt receiver has several addresses of the Lbus address space and each interrupt source sends a interrupt data signal to a unique predetermined address on the Lbus 42. A combination of the two is also possible.

A hypothetical example shows the interaction of these circuits. The serial controllers 46, 48, 50, the GPIO controller 52, the MIDI controller 54, the sound circuit 56, and the UART 58, all share the sharable interrupt synchronized by the interrupt receiver 84 of the present invention. If a peripheral device, e.g., first serial controller 46, has just received data for which the processor 20 must execute an interrupt service routine, the bridge (not shown) internal to that peripheral device 46 requests control of the Lbus 42. Once the arbiter (not shown) of the Lbus 42 grants the peripheral device 46 control of the Lbus 42, the peripheral circuit 46 attempts to write the data to the data memory 24 via the Lbridge 44 and the DMCTL 36. If the data memory cannot be directly written to, e.g., the DSP core 20 is accessing it via the DBIU 28 and the DMCTL 36, then the Lbridge 44 will not acknowledge the write and the peripheral device must continue asserting the data and address on the Lbus 42, as known to those in the art. Once the data memory can be accessed, the received data is written from the peripheral device 46 to the data memory 24. Since the write was coordinated by the Lbridge 44 and the DMCTL, once the write cycle of the final portion of received data is complete, that final portion of data is stored in the data memory 24. Thereafter, preferably immediately thereafter (and certainly before the peripheral device 46 relinquishes control of the Lbus 42), the peripheral device 46 transmits an interrupt data signal onto the Lbus 42 to the bridge 88 of the interrupt receiver 84. After the bridge 88 of the interrupt receiver 84 receives the interrupt data signal from the Lbus 42, the interrupt circuit 86 asserts an interrupt signal on the interrupt bus 92 that corresponds to the particular peripheral device 46 that transmitted the interrupt data signal onto the Lbus 42. In response to receiving the interrupt asserted by the interrupt circuit 86 onto the interrupt bus 92, the processor 20 services the interrupt by executing code at an interrupt service vectored location, as known to those in the art. Because the buses shown are serial in nature, the interrupt data signal is guaranteed to arrive at the interrupt receiver 84 after the data arrives in the data memory 24. That is, since the interrupt data signal followed at least partly the same data path as the data (both were transmitted across the Lbus 42), the processor 20 can access the data written to the data memory 24 by the peripheral device 46 without the risk of using stale data. The above process is followed by all of the devices sharing the interrupt synchronized by the interrupt receiver 84, with each peripheral device communicating its identity to the interrupt receiver 84 so the processor 20 can execute the proper interrupt service routine.

Figure 2:
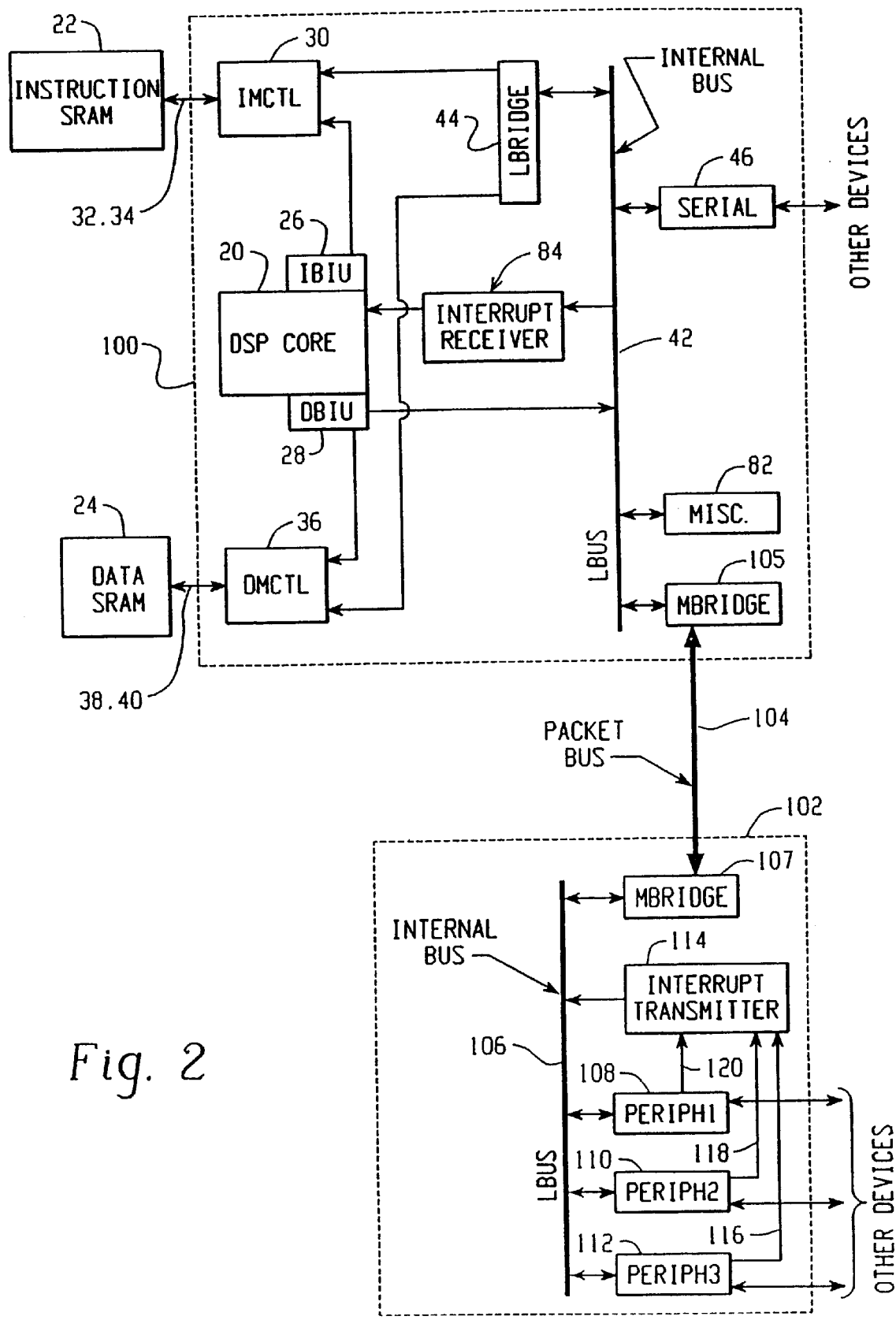
FIG. 2 is a block diagram of a second embodiment of the present invention.

FIG. 2 shows an alternative embodiment in which the latency of the data path is exacerbated by having two chips 100, 102 that are connected by a packet Mbus 104. The first chip 100 is similar to the chip 12 in FIG. 1 in that the-first chip 100 has a DSP core 20, instruction memory 22, data memory 24, IBIU 26, DBIU 28, IMCTL 30. DMCTL 36, Lbus 42. Lbridge 44, a serial controller 46, interrupt receiver 84, etc., which are identical to those in FIG. 1. The first chip 100 differs front the chip 12 in that is has an Mbridge 105 that interfaces the Mbus 104 to the Lbus 42 and it has fewer peripheral devices.

The second chip 102 also has an Lbus 106, an Mbridge 107 interfacing that Lbus 106 to the Mbus 104, and three peripheral devices 108, 110, 112, which can be any of the peripheral devices 46, 48, 50, 52, 54, 56, 58, 62, 66, 82 described above in connection with FIG. 1, and an interrupt transmitter 114. The peripheral devices 46, 48, 50, 52, 54, 56, 58, 62, 66, 82 described above all have internal interrupt transmitters (not shown), each of which transmit an interrupt data signal (interrupt packet) onto the Lbus 42 in FIG. 1. In FIG. 2, the various devices 108, 110, 112 all share a single interrupt transmitter 114 and are connected thereto by discrete interrupt lines 116, 118, 120, which interrupt lines are known to those in the art. The interrupt transmitter 114 receives signals on the discrete interrupts 116, 118, 120, and transmit an appropriate interrupt data signal (interrupt packet) onto the Lbus 106.

The Mbus is an 8-bit scaleable packet bus. Since the Lbuses have 32 bits of address and 16 bits of data, it takes at least six data cycles of the Mbus 104 to perform one data cycle on an Lbus 42, 106. The three buses 42, 104, 106 can either be locked or pipelined or a combination of both. In the locked configuration, then to transfer data from a peripheral device in the second chip 102 to the data memory 24, a device e.g., peripheral device 108, must become a bus master of four buses: Lbus 106, Mbus 104, Lbus 42, and DAB/DDB 38, 40. In the pipelined configuration, the Mbridges 105, 107 each have RAM or a FIFO (not shown) to buffer the data so that data can be written to the Lbus 106 (buffered in the Mbridge 107), then written to the Mbus 104 (buffered in the Mbridge 105), and then written to the Lbus 42. While pipelining or partial pipelining shortens the time it takes to write data onto the Lbus 106, it clearly exacerbates the latency problem because the peripheral devices 108, 110, 112 are completely out of the loop in terms of when the data is written to the data memory 24. Thus, having an interrupt transmitter 114 and interrupt receiver 84 of the present invention is particularly useful in the pipelined or partially pipelined situations.

Another hypothetical example shows the interaction of the circuits of FIG. 2 using the pipelined configuration. Here, the serial controller 46 and peripheral devices 108, 110, 112 all share the sharable interrupt synchronized by the interrupt receiver 84 of the present invention. If a peripheral device, e.g., first peripheral device 108, has just received data for which the processor 20 must execute an interrupt service routine, the bridge (not shown) internal to that peripheral device 108 requests control of the Lbus 106. Once the arbiter (not shown) of the Lbus 106 grants the peripheral device 108 control of the Lbus 106, the peripheral device 108 writes the data to the buffer in the Mbridge 107. Thereafter, preferably immediately thereafter (and certainly before the peripheral device 108 relinquishes control of the Lbus 106), the peripheral device 108 transmits an interrupt data signal onto the Lbus 106 directed toward the bridge of the interrupt receiver 84. The interrupt data signal will essentially follow the final portion of data as it travels across the Lbus 106, the Mbus 104, and the Lbus 42.

Once the Mbridge 107 receives the first portion of data from the peripheral device 108, the Mbridge 107 arbitrates for control of the Mbus 104. Once the arbiter (not shown) of the Mbus 104 giants the Mbridge 107 control of the Mbus 104, the Mbridge 107 writes the data across the Mbus 104 to the Mbridge 105. After receiving the data and interrupt data signal (interrupt packet) from the Mbridge 107, the Mbridge 105 arbitrates for control of the Lbus 42. Once the arbiter (not shown) of the Lbus 42 grants the Mbridge 105 control of the Lbus 42, the Mbridge 105 tries to write the data to the data memory 24 via the Lbridge 44 and the DMCTL 36. If the data memory cannot be directly written to, e.g., the DSP core 20 is accessing it via the DBIU 28 and the DMCTL 36, then the Lbridge 44 will not acknowledge the write and the Mbridges 105 must continue asserting the data and address on the Lbus 42, as known to those in the art. Once the data memory can be accessed, the received data is written from the Mbridge 105 to the data memory 24. Since the write was coordinated by the Lbridge 44 and the DMCTL, once the write cycle of the final portion of received data is complete, that final portion of data is stored in the data memory 24.

After the bridge 88 of the interrupt receiver 84 receives the interrupt data signal from the Lbus 42, the interrupt circuit 86 asserts an interrupt signal on the interrupt bus 92 that corresponds to the particular peripheral device 46 that transmitted the interrupt data signal onto the Lbus 42. In response to receiving the interrupt asserted by the interrupt circuit 86 onto the interrupt bus 92, the processor 20 services the interrupt by executing code at an interrupt service vectored location, as known to those in the art. Again, because the buses shown are serial in nature, the interrupt data signal is guaranteed to arrive at the interrupt receiver 84 after the data arrives in the data memory 24. That is, since the interrupt data signal followed at least partly the same data path as the data (both were transmitted across the Lbus 106, Mbus 104, and Lbus 42), the processor 20 can access the data written to the data memory 24 by the peripheral device 46 without the risk of using stale data. The above process is followed by all of the peripheral devices 108, 110, 112 sharing the interrupt synchronized by the interrupt receiver 84, with each peripheral device communicating its identity to the interrupt receiver 84 so the processor 20 can execute the proper interrupt service routine.

While the present invention has been illustrated by the description of embodiments thereof, and while certain aspects of the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

We claim:

1. A processing system, comprising:
   (a) a processor;
   (b) a memory circuit in circuit communication with said processor
   (c) a first bridge circuit in circuit communication with said memory circuit and a bus, said first bridge circuit interfacing between said memory circuit and said bus;
   (d) at least one peripheral circuit in circuit communication with said bus, said at least one peripheral circuit for receiving data from an external circuit, said at least one peripheral circuit transmitting the received data across said bus to said memory circuit via at least said first bridge circuit, said at least one peripheral circuit transmitting said received data across said bus in at least one portion including a final portion, said at least one peripheral circuit transmitting a predetermined interrupt data signal onto said bus after transmitting the final portion of the received data onto said bus;
   (e) an interrupt circuit in circuit communication with said processor via an interrupt bus; and
   (f) a second bridge circuit in circuit communication with said interrupt circuit and said bus, said second bridge circuit interfacing between said interrupt circuit and said bus; and
   wherein said interrupt circuit generates an interrupt signal to said processor across said interrupt bus responsive to receiving the predetermined interrupt data signal from said bus via said second bridge circuit, thereby assuring that said processor is interrupted after the final portion of the received data is stored in said memory circuit.

2. A processing system according to claim 1 wherein said interrupt bus comprises a plurality of bus lines.

3. A processing system according to claim 1:
   wherein said at least one peripheral device comprises a plurality of peripheral circuits in circuit communication with said bus, with each of said peripheral devices transmitting data to said memory circuit across said bus; and
   wherein each of said peripheral devices transmits the received data across said bus to said memory circuit via at least said first bridge circuit, each of said peripheral circuits transmits said received data across said bus in at least one portion including a final portion, and each of said peripheral circuits transmits a predetermined interrupt data signal onto said bus after transmitting the final portion of the received data onto said bus.

4. A processing system according to claim 1 wherein there is another bus and an associated other bridge between said at least one peripheral circuit and said bus.

5. A processing system according to claim 4 wherein the at least one portion of received data is at least partially pipelined between said peripheral device and said memory circuit.

6. A processing system according to claim 1 wherein there are a plurality of other buses and associated other bridges between said at least one peripheral circuit and said bus.

7. A processing system according to claim 6 wherein the at least one portion of received data is at least partially pipelined between said peripheral device and said memory circuit.

8. A processing system according to claim 1 wherein the at least one portion of received data is at least partially pipelined between said peripheral device and said memory circuit.

9. A processing system, comprising:
   (a) a processor;
   (b) a memory circuit in circuit communication with said processor;
   (c) a peripheral device in circuit communication with said memory circuit via a bus; and
   (d) an interrupt circuit in circuit communication with said peripheral circuit via said bus and in circuit communication with said processor via an interrupt bus; and
      (1) wherein said peripheral device transmits data to said memory circuit across said bus and then transmits a predetermined interrupt data signal to said interrupt circuit across said bus; and
      (2) wherein said interrupt circuit asserts an interrupt signal onto said interrupt bus to interrupt said processor responsive to receiving the predetermined interrupt data signal from said bus, thereby assuring that said processor is interrupted after the data is transmitted to said memory circuit.

10. A processing system, comprising:
   (a) a processor;
   (b) a memory circuit in circuit communication with said processor;
   (c) a peripheral device in circuit communication with said memory circuit via a bus; and
   (d) an interrupt circuit in circuit communication with said peripheral circuit via said bus and in circuit communication with said processor via an interrupt bus; and
      (1) wherein said peripheral device transmits data to said memory circuit across said bus;
      (2) wherein said peripheral device transmits a predetermined interrupt data signal to said interrupt circuit across said bus; and
      (3) wherein said interrupt circuit asserts an interrupt signal onto said interrupt bus to interrupt said processor responsive to receiving the predetermined interrupt data signal from said bus.

\* \* \* \* \*